(12) United States Patent
Yamamoto

(10) Patent No.: US 7,352,387 B2
(45) Date of Patent: Apr. 1, 2008

(54) CAMERA WITH POSITIONING DEVICE USED TO CAPTURE MAGNIFIED AND DEMAGNIFIED IMAGES

(75) Inventor: Masao Yamamoto, Tokyo (JP)

(73) Assignee: Scaler Corporation, Tokyo (JP)

( * ) Notice: Subject to any disclaimer, the term of this patent is extended or adjusted under 35 U.S.C. 154(b) by 722 days.

(21) Appl. No.: 10/276,182
(22) PCT Filed: Apr. 5, 2002
(86) PCT No.: PCT/JP02/03433

§ 371 (c)(1),
(2), (4) Date: Nov. 14, 2002

(87) PCT Pub. No.: WO02/082155
PCT Pub. Date: Oct. 17, 2002

(65) Prior Publication Data
US 2003/0107668 A1   Jun. 12, 2003

(30) Foreign Application Priority Data
Apr. 5, 2001 (JP) ............... 2001-107770
Feb. 5, 2002 (JP) ............... 2002-27708
Feb. 5, 2002 (JP) ............... 2002-27709

(51) Int. Cl.
H04N 7/18 (2006.01)

(52) U.S. Cl. ............ 348/63; 348/335; 352/139; 359/425; 359/506; 359/612; 359/693; 359/801; 359/826; 396/71; 396/76; 396/199; 396/505; 396/534

(58) Field of Classification Search .......... 348/61, 348/63, 79, 131, 335, 360, 361, 65–68, 97; 396/76, 199, 200, 432, 505, 507, 71, 120, 396/424, 534; 352/139; 359/425, 506, 600, 359/611, 612, 693, 699, 704, 705, 801–809, 359/826
See application file for complete search history.

(56) References Cited

U.S. PATENT DOCUMENTS 3,195,431 A * 7/1965 Augustin, Jr. et al. ...... 396/199

(Continued)

FOREIGN PATENT DOCUMENTS

JP 46-33495 10/1971

(Continued)

OTHER PUBLICATIONS

English Translations of Japanese Pat. Applns. 46-33495, 6-148527, 3007843 and 9-46567 International Search Report.

*Primary Examiner*—Lin Ye
*Assistant Examiner*—Chriss S Yoder, III
(74) *Attorney, Agent, or Firm*—Michael Bednarek; Paul, Hastings, Janofsky & Walker LLP

(57) ABSTRACT

To provide a camera that is suited to shoot both a demagnified image and a magnified image.

The camera includes a housing body 11 containing a CCD 15, and a lens barrel 12. An abutted member 20 having an objective lens 40 therein is engaged with the lens barrel 12 and a rotatable manually-controlled member 30 is fitted around that lens barrel. The abutted member 20 moves back and forth in the direction of an optical axis K in response to the rotation of the manually-controlled member 30. A user moves the objective lens 40 back and forth by moving the abutted member 20 back and forth to shoot either a demagnified image or a magnified image. A demagnified image is photographed with the abutted member 20 contained in the lens barrel 12. A magnified image is photographed with the abutted member 20 projected from the lens barrel 12. An end of the abutted member 20 is positioned so that the focal point of the objective lens 40 falls on the center thereof. To shoot the magnified image, the user abuts the end of the abutted member 20 against the object.

20 Claims, 7 Drawing Sheets

U.S. PATENT DOCUMENTS

| | | | | |
|---|---|---|---|---|
| 3,263,584 | A | * | 8/1966 | Knus .......................... 396/199 |
| 3,385,188 | A | * | 5/1968 | Ellman ....................... 396/199 |
| 3,891,310 | A | * | 6/1975 | Hideo et al. ................ 359/706 |
| 3,944,341 | A | * | 3/1976 | Pomerantzeff .............. 351/206 |
| 4,382,661 | A | * | 5/1983 | Kamata ....................... 359/705 |
| 4,448,496 | A | * | 5/1984 | Isobe et al. ................. 359/705 |
| 4,468,107 | A | * | 8/1984 | Yabe .......................... 396/530 |
| 5,028,941 | A | * | 7/1991 | Sohn .......................... 348/376 |
| 5,077,569 | A | * | 12/1991 | Notagashira et al. ......... 396/71 |
| 5,416,544 | A | * | 5/1995 | Stapleton ................... 396/544 |
| 5,576,781 | A | * | 11/1996 | Deleeuw ....................... 396/6 |
| 5,833,612 | A | | 11/1998 | Eckhouse et al. ............ 600/476 |
| 5,960,217 | A | * | 9/1999 | Goto ........................... 396/65 |
| 6,052,534 | A | * | 4/2000 | Goto ........................... 396/71 |
| 6,215,586 | B1 | * | 4/2001 | Clark .......................... 359/363 |
| 6,449,102 | B1 | * | 9/2002 | Goto ........................... 359/693 |

FOREIGN PATENT DOCUMENTS

| | | |
|---|---|---|
| JP | 6-148527 | 5/1994 |
| JP | 3007843 | 12/1994 |
| JP | 9-46567 | 2/1997 |

\* cited by examiner

CAMERA WITH POSITIONING DEVICE USED TO CAPTURE MAGNIFIED AND DEMAGNIFIED IMAGES

TECHNICAL FIELD

The present invention relates to a camera that can shoot both demagnified images and magnified images.

BACKGROUND OF THE INVENTION

Typical cameras are configured to direct the light from the object onto image pickup means, such as a film or a CCD, through an objective lens. An image of the object is formed by a certain reaction between the image pickup means and the light from the object.

Images to be photographed are of various types and formats, classified in different ways. A class of images to be photographed categorizes them into demagnified images and magnified images.

The demagnified image refers to a smaller image of a subject/object that is focused onto the image pickup means (e.g., CCD) when the subject/object is larger than the image pickup plane of the image pickup means. Examples include common images of portrait and landscape pictures. On the other hand, the magnified image refers to a larger image of the object that is focused onto the image pickup means (e.g., CCD) when the object is smaller than the image pickup plane of the image pickup means. Examples include close-up shots of, for example, a part of a thin fiber or the texture of the human skin.

As is known, conventional cameras are available for shooting either the demagnified images or magnified images. It is theoretically possible to shoot both demagnified images and magnified images by varying the distance from the objective lens to the image pickup means and the distance from the objective lens to the object, according to a certain relation. Such devices, however, are not yet in practical use.

Possible reasons are as follows.

The area to be photographed for a magnified image is obviously small. This means that shooting a magnified image requires the object to be within that narrow range. This is often difficult to achieve. To cope with this, cameras designed for shooting magnified images usually have a mechanism to fix the relative position between the object and the image pickup means, as can be found in video microscopes. Such a mechanism may be unnecessary when shooting a demagnified image and, if anything, it may be an obstacle in shooting demagnified images. Thus, cameras designed for shooting demagnified images have different requirements in configuration from those designed for shooting magnified images. Combining the functions for demagnified images and magnified images together into a single camera is not so easy.

Besides the above-mentioned configuration reasons, there is another circumstance that the demagnified images do not share their utility and customers with the magnified images. Photographing both demagnified images and magnified images using a single camera is not in demand, at least up to now.

These situations have delayed the development of a camera that can shoot both demagnified images and magnified images.

However, if it is possible to shoot, for example, a demagnified image of the whole body of a person and a magnified image of a part of his or her skin surface using a single camera, a magnified image of the lesion on the skin and a demagnified image of a full-length portrait with the position of the lesion can be photographed, thereby indicating the condition of a lesion along with the information about where it is in the body. Another example is a magnified image of a surface defect in a product photographed along with an entire picture of that product. The details of a defect can thus be indicated in addition to the position of the defect in a product.

This suggests that cameras available for shooting both the demagnified images and magnified images do not lack their demands. Rather, usefulness of such cameras has not been fully appealed. This means that the cameras that can shoot both of the above-mentioned kinds of images may create an active demand when their utility meets with general acceptance.

In addition, the cameras that can photograph both demagnified images and magnified images may supply entertainment and amusement to users which conventional cameras cannot be achieved. Such cameras with innovative entertainment and amusement are also expected to create additional demands.

The present invention is made with respect to the above circumstances and an object thereof is to provide a camera that is suitable for shooting both demagnified images and magnified images.

DISCLOSURE OF THE INVENTION

The present inventors propose a camera and a unit for a camera as the present invention to solve the above-mentioned problems.

A camera according to the present invention is based on a camera comprising an objective lens; and image pickup means for building up an image using the light from an object, the light from the object being adapted to be directed to the image pickup means through said objective lens. The objective lens is movable along the optical axis of said light from the object at least between a first range span within which an image built up by the image pickup means is a demagnified image and a second range span within which an image built up by the image pickup means is a magnified image. In addition, this camera comprises positioning assistance means adapted to be used with an end thereof abutted against said object when said objective lens is located in said second range span, the positioning assistance means contributing to maintaining the distance between said object and said objective lens within the extent to which a focal point of said objective lens falls on the part of the object to be photographed, the positioning assistance means being located outside the field of view of the objective lens in said first range span.

The camera of the present invention may comprise a housing for holding the objective lens and the image pickup means therein. In such a case, the above-mentioned positioning assistance means is fitted to the housing in such a manner that it comes outside the field of view of the objective lens in the first range span.

As described above, the objective lens in the camera is movable along the optical axis of the light from the object between the first range span within which an image built up by the image pickup means is the demagnified image and the second range span within which an image built up by the image pickup means is the magnified image. Accordingly, the camera can shoot both demagnified images and magnified images.

The camera also comprises positioning assistance means. The positioning assistance means is used with the end thereof abutted against the object when the objective lens is located in the second range span. In addition, the positioning assistance means, during the use, contributes to maintaining the distance between the object and the objective lens within the extent to which a focal point of the objective lens falls on the part of the object to be photographed. The positioning assistance means allows the user to shoot a magnified image using this camera while holding the camera relatively steady and the end of the positioning assistance means is abutted against a point out of the area corresponding to the part of the object to be photographed. Accordingly, this reduces the problem that the object leaves the picture area of the camera due to camera shake during shooting of a magnified image.

The positioning assistance means contributes to maintaining the distance between the object and the objective lens within the extent to which the focal point of the objective lens falls. This means that the positioning assistance means also has the function of facilitating image pickup while maintaining the focal point of the subject in focus on the object with the end of the positioning assistance means abutted against the object. Shooting an image using a hand-held camera which is not in contact with the object often involves camera shake. This is because focusing becomes very difficult. On the contrary, the camera according to the present invention reduces the camera shake, which in turn reduces the above-mentioned difficulty associated with the focusing, by allowing the end of the positioning assistance means to be abutted against the object.

Taking the above into consideration, the camera according to the present invention can be said to have a chance to prove its merits when it is applied to a hand-held camera.

As described above, a prerequisite for the positioning assistance means in the camera according to the present invention is that it can contribute to maintaining the distance from the object to the objective lens within the extent to which the focal point of the objective lens falls on the object.

This may be configured as, for example, a single rod-shaped member projected from the housing of the camera. In such a case, the length of the rod-shaped member along the optical axis thereof should be the length that the distance from the object to the objective lens is within the extent to which the focal point of the objective lens falls on the part of the object to be photographed when the end of the rod-shaped member is abutted against the subject. In this example where the positioning assistance means is formed of a single rod-shaped member, point contact is achieved between the positioning assistance means and the object. Because of the point contact, the camera tends to move pivotally about that end even when the end is contacted with the object. However, shooting of magnified images can be made easier in a more stable manner than in the case where the camera is completely away from the object to shoot an image.

The positioning assistance means may be formed of multiple, e.g., three rod-shaped members. In such a case, a magnified image can be photographed while achieving three point support at the three points on the end of the rod-shaped members which serve as the positioning assistance means. This contributes to maintaining a fixed distance between the object and the objective lens when the end of the positioning assistance means is brought into contact with a planar object. Such positioning assistance means does not allow any pivotal movement as described above. This ensures a fixed distance from the part of the object to be photographed to the image pickup means when abutted against the object. In addition, shooting in this state can be made in a significantly stable manner. In other words, employing such positioning assistance means ensures that the focal point of the objective lens automatically falls on the part of the object to be photographed by abutting the end of it against the object. The camera can be held steady without camera shake. Accordingly, magnified images can be photographed more easily.

Examples of the configuration to be applied to the end of the positioning assistance means having the above-mentioned functions (i.e., the function to provide a fixed distance between the object and the objective lens and to maintain the steady condition of the camera when the end is brought into contact with a planar object) include configurations that can achieve abutment against a certain plane at three or more points, or can achieve contact to a certain plane along a straight line plus at one or more points, or can achieve curved line contact to a certain plane, or can achieve surface contact to a certain plane.

The positioning assistance means in the present invention is located outside the field of view of the objective lens when it is in the first range span. Accordingly, there is no possibility that the positioning assistance means interferes with shooting of a demagnified image when the camera is used as an ordinary camera.

The position of the positioning assistance means may or may not appear in the field of view of the objective lens when the objective lens is in the second range span. The positioning assistance means does not interfere with shooting of a demagnified image when it does not appear in the field of view of the objective lens that is in the second range span and when the end of the positioning assistance means that is abutted against the object is located out of the area corresponding to the part of the object to be photographed. On the other hand, when the positioning assistance means appears in the field of view of the objective lens while the objective lens is in the second range span, the positioning assistance means may interfere with shooting of an image. For example, the end of the positioning assistance means in the part of the object to be photographed appears in a demagnified image when an attempt to shoot the demagnified image is made while the end of the positioning assistance means is abutted against the object at a position within the area corresponding to the part of the object to be photographed.

However, it may be turned to advantages. In such a case, the positioning assistance means is limited so that it appears in the demagnified image only in a limited small portion of the part of the object of which demagnified image is to be photographed. As apparent from the above, the positioning assistance means is ensured not to substantially interfere with shooting of an image. The positioning assistance means may be provided with reference means at the end thereof as an indication that allows the user to find out the size of the object by comparing the reference means with the object. By comparing the object that is included in the photographed image with the reference means, an approximate size of the object can be determined, which is convenient. In order to ensure that the positioning assistance means does not substantially interfere with shooting of an image, the length of the part of the object with which the end of the positioning assistance means contacts may be allowed for only a small portion near the outer periphery of the part of the object to be photographed. The reference means may be a scale with predetermined readings.

The positioning assistance means of the present invention may be fixed to, for example, the housing of the camera.

Alternatively, the positioning assistance means may be located at different positions between where the objective lens is in the first range span and where it is in the second range span to allow movement of the positioning assistance means with respect to, for example, the housing.

The positioning assistance means is allowed to move by the consideration of the following circumstances. The field of view of the camera is larger when the objective lens is in the first range span than when it is in the second range span. Therefore, the positioning assistance means is more likely to appear in the object while the objective lens is in the first range span for example. Thus, it can be expected that the situation hardly occurs where the positioning assistance means appears in the field of view of the objective lens in the first range span and interferes with shooting of an image if the positioning assistance means is farther from the field of view of the objective lens while it is in the first range span than in the second range span.

Examples of the positioning assistance means may include the following. For example, the positioning assistance means can be contained within the housing while the objective lens is in the first range span. This configuration prevents the positioning assistance means from interfering with shooting of an image even when the objective lens is in the first range span to shoot a demagnified image.

As described above, the positioning assistance means may be moved relative to, for example, the housing. The positioning assistance means may be moved in any manner. For example, it may be moved while rotating with respect to the housing. Alternatively, it may be moved in parallel to the housing.

In the case where the object is skin of a person and the end of the positioning assistance means is abutted against the skin, rotation of the positioning assistance means may result in uncomfortable feeling of the subjected person. In order to prevent this, the movement of the positioning assistance means relative to, for example, the housing may be in parallel. This reduces uncomfortable feeling of a user by the positioning assistance means.

The positioning assistance means may be moved in any directions. There is no limitation about the direction of its movement provided that the positioning assistance means does not appear in the part of the object to be photographed while the objective lens is in the first range span. For example, the positioning assistance means may be moved along the above-mentioned optical axis. As a result, the direction of movement of the positioning assistance means is basically perpendicular to the skin. This eliminates uncomfortable feeling of a user during shooting of an image of his or her skin.

In the camera of the present invention, the objective lens may be moved in cooperation with the positioning assistance means. This eliminates the necessity of moving the objective lens and the positioning assistance means separately, which is convenient.

The shape of the positioning assistance means in the camera of the present invention and the manner of its movement have many variations as apparent from the above.

One of these, an example is positioning assistance means having an opening formed therein at an end thereof on the optical axis, the end of the positioning assistance means being abutted against the object when the objective lens is in the second range span, the positioning assistance means being movable along the optical axis in such a manner that the end is located closer to the image pickup means when the objective lens is in the first range span than when it is in the second range span. Such positioning assistance means is located at a position where the focal point of the objective lens falls on the opening when the objective lens is in the second range span. The opening has a size that is generally equal to the size of the region within which objects can be built up by the image pickup means when the objective lens is in the second range span.

In the camera having such positioning assistance means, the opening formed in the objective lens at the end thereof has a size close to the size of the area to be photographed. It is not excessively larger than the area to be photographed. This configuration brings about the following advantages.

For example, in order to shoot a magnified image of a flexible object such as human skin, the opening in the positioning assistance means is abutted against the object. The flexible object then enters the opening, creating a swelling of the object. In this case, the swollen object approaches the objective lens. The focal point of the objective lens is away from the area to be photographed. Accordingly, the camera of the present invention employs a small opening as described above. By using the small opening, it is possible to minimize the amount of swelling of the object when the opening is abutted against the object. As a result, the part of the object to be photographed is more likely to be in focus within the depth of field of the objective lens. Taking the above into consideration, the size of the opening should be such that the swelling of an object, which may be produced when the outer periphery of the opening in the positioning assistance means at the end thereof is abutted against the human skin, is included in the depth of field of the objective lens. The opening may generally conform with the outer periphery of the part of the object to be photographed. The edge of the opening may appear in the area to be photographed, provided that it does not substantially interfere with shooting of a magnified image.

It is noted that the region within which objects can be built up by the image pickup means may take any one of various shapes, such as a circle and a rectangle.

With a rectangular area to be photographed, the above-mentioned opening may be round in shape in which the region within which objects can be built up by the image pickup means is inscribed when the objective lens is in the second range span. With a round film plane of the image pickup means, the opening may be a concentric circle that shares the axis thereof with the film plane, in which the opening generally coincides with the film plane of the image pickup means when the objective lens is in the second range span.

As described above, the positioning assistance means included in the camera of the present invention may have an opening formed therein at an end thereof along the optical axis, the end of the positioning assistance means being abutted against the object when the objective lens is in the second range span, the positioning assistance means being movable along the optical axis in such a manner that the end is located closer to the image pickup means when the objective lens is in the first range span than when it is in the second range span. In the camera including such positioning assistance means, the distance that the objective lens travels between the first range span and the second range span may be smaller than the distance that the positioning assistance means travels in association with the movement of the objective lens between the first range span and the second range span.

In the camera having the above-mentioned configuration, the distance that the positioning assistance means travels is larger than the distance that the objective lens travels. This indicates that the movement of the object lens from the second range span to the first range span results in backward travel of the positioning assistance means much more than the objective lens (and approaches the image pickup means). This configuration brings about the following advantages.

It has already been described that it is preferable that the opening in the positioning assistance means at the end thereof is as small as the area to be photographed particularly for a flexible object in the camera of the present invention. However, the smaller the opening is, the higher the possibility of the edge of the opening (the edge of the opening in the positioning assistance means at the end thereof) becomes that appears in front of the film plane of the image pickup means (it appears in front of the film plane of the image pickup means to the extent that it substantially interferes with shooting of an image) in shooting a demagnified image. Thus, the positioning assistance means is retracted much more than the objective lens in shooting a demagnified image using the above-mentioned camera. In other words, the opening in the positioning assistance means is made closer to the objective lens in shooting a demagnified image. This reduces the chance of the edge of the opening to appear in front of the film plane of the image pickup means. This facilitates reduction in size of the opening without affecting shooting of the demagnified images.

The objective lens is a lens facing the object. The objective lens may be a single lens or a combination of two or more lenses. For example, an objective lens having less aberration can be formed of three lenses, i.e., a concave lens, a convex lens, and a concave lens that are arranged in this order. A fixed lens may also be provided in addition to the movable objective lens.

The objective lens may be movable along the optical axis in the second range span. As described above, the camera of the present invention ensures easier shooting of a magnified image in focus by means of abutting the end of the positioning assistance means against the object. However, the object may be out of focus when it has irregularities. By allowing the objective lens to move in the second range span, the focal point can be adjusted precisely when the object has irregularities, which is advantageous.

The objective lens may also be movable along the optical axis in the first range span. Of course, the objective lens may be movable along the optical axis both in the first and second range spans.

The objective lens may be moved by using any one of suitable configurations. It may be moved manually by using a mechanical mechanism. Alternatively, it may be moved by using driving means such as a motor or an actuator that is provided separately.

Movement of the objective lens may be performed by means of manually-controlled means as described below and manually controlling the manually-controlled means. The manually-controlled means may be movable, for example, from a first position to a second position. The objective lens may be configured so that it moves from the first range span to the second range span in response to the movement of the manually-controlled means.

The amount of movement of the objective lens in response to the movement of the manually-controlled means may correspond to the amount of movement of the manually-controlled means. This allows the user to intuitively find out the amount of movement of the objective lens that results in the movement of the manually-controlled means. In addition, the manually-controlled means may be configured so that the amount of movement of the objective lens in response to the movement of it is smaller when the objective lens is inside the first range span and the second range span than when it is outside the first range span and the second range span. The first range span and the second range span are aligned in the order of the first range span, the portion other than the first and second range spans, and the second range span. The movement of the objective lens that is required for the first range span and the second range span should be adjusted slightly because the movement is for the purpose of focusing. On the contrary, no image is to be taken in general when the objective lens is outside the first and second range spans. The objective lens should preferably be moved as fast as possible across this region. The above-mentioned relation in amount of movement between the manually-controlled means and the objective lens makes it possible to move the objective lens at a high speed across the region other than the first and second range spans where the object lens should be moved as fast as possible. In addition, the objective lens can be moved precisely and positively in the first and second range spans where it should be.

The objective lens may be fitted to the camera in any manner. For example, the objective lens may be fitted to the positioning assistance means. In this case, the positioning assistance means may be movable in the direction of the optical axis.

As described above, the positioning assistance means may take one of various shapes. For example, the positioning assistance means may be tubular. The above mentioned opening may be formed in the positioning assistance means at the end thereof when the positioning assistance means is tubular in shape.

In the case where the tubular positioning assistance means is used, the objective lens may be fitted to and contained inside the tubular positioning assistance means. The objective lens may or may not be fixed to the positioning assistance means. As described above, the positioning assistance means may be movable and the direction of movement may be in the axial direction of the tubular shape.

The housing of the camera in the present invention may take any one of various shapes. The housing may include, for example, a housing body and a lens barrel that is projected from the housing body. In other words, the appearance of the camera according to the present invention is similar to that of typical cameras.

The camera having the lens barrel may be, for example, as follows.

This camera is based on a camera comprising a tubular lens barrel; an object lens contained in the lens barrel; and image pickup means for building up an image using the light from an object, the light from the object being adapted to be directed to the image pickup means through the objective lens. The objective lens is movable along the optical axis of the light from the object at least between a first range span within which an image built up by the image pickup means is a demagnified image and a second range span within which an image built up by the image pickup means is a magnified image. In addition, the camera further comprises positioning assistance means having an opening formed therein at an end thereof on the optical axis, the end of the positioning assistance means being abutted against the object when the objective lens is in the second range span, the positioning assistance means being movable along the optical axis in such a manner that the end is located closer to the image pickup means when the objective lens is in the first range span than when it is in the second range span. The positioning assistance means is located at a position where the focal point of the objective lens falls on the opening when the objective lens is in the second range span, the opening having a size that is generally equal to the size of the region within which objects can be built up by the image pickup means when the objective lens is in the second range span.

Alternatively, the camera having a lens barrel may be as follows.

This camera is based on a camera comprising a tubular lens barrel; an object lens contained in the lens barrel; and image pickup means for building up an image using the light from an object, the light from the object being adapted to be directed to the image pickup means through the objective lens. The objective lens is movable along the optical axis of the light from the object at least between a first range span within which an image built up by the image pickup means is a demagnified image and a second range span within which an image built up by the image pickup means is a magnified image. In addition, the camera further comprises positioning assistance means having an opening formed therein at an end thereof on the optical axis, the end of the positioning assistance means being abutted against the object when the objective lens is in the second range span, the positioning assistance means being movable along the optical axis in such a manner that the end is located closer to the image pickup means when the objective lens is in the first range span than when it is in the second range span.

When the camera of the present invention is provided with the lens barrel, the positioning assistance means may be fitted to the lens barrel in such a manner that the positioning assistance means is movable in the axial direction of the lens barrel. In this event, the positioning assistance means may be fitted to either an outer portion or an inner portion of the lens barrel. When fitted to the inner portion of the lens barrel, the positioning assistance means is inserted into and engaged with the inner surface of the lens barrel.

The positioning assistance means in the above-mentioned camera having a lens barrel may take any one of various shapes. For example, it may be tubular in shape as described above. An opening may be formed in it at the end thereof as described above. The positioning assistance means may be coaxial with the lens barrel when it is tubular in shape. Both the lens barrel and the tube may be round in cross section. One of the lens barrel and the tube may be tapered.

For the camera having a lens barrel, the above-mentioned manually-controlled means may be fitted around the lens barrel. The manually-controlled means that is fitted around the lens barrel may be hollow cylindrical in shape (including a ring shape). Such manually-controlled means may be coaxially fitted around the lens barrel to conform with the outer periphery of the lens barrel. The manually-controlled means in this case may be configured in such a manner that the positioning assistance means moves in the axial direction of the lens barrel through the rotation of the manually-controlled means.

Regardless of the presence or absence of the lens barrel, the camera may further comprise illumination means that is adapted to illuminate at least the part of the object to be photographed when the objective lens is in the second range span. This illumination ensures proper illumination of a magnified image.

When the camera has the opening at the positioning assistance means, the illumination means illuminates at least the part of the object to be photographed by exposing an inside area of the opening to the light when the objective lens is in the second range span.

The illumination means may be a light source that emits its own like a light bulb and an LED, or an edge surface of an optical fiber propagating the light from a predetermined light source to emit predetermined light components.

The illumination means may be provided at any position on the camera. For example, the illumination means may be disposed inside the lens barrel when the camera has lens barrel as described above. The illumination means may be fitted to the positioning assistance means. The illumination means may be disposed inside the tube when the positioning assistance means is tubular in shape. With the illumination means fixed to the positioning assistance means, the illumination means moves along with the movement of the positioning assistance means.

The illumination means is enough to be lit only when needed. Thus, it may be lit only when the objective lens is in the second range span.

With the illumination means, the camera of the present invention may comprise light shielding means that is configured to protect the part of the object to be photographed from external light when the objective lens is in the second range span and when the positioning assistance means is abutted against the object. With such light shielding means, the camera of the present invention can shoot magnified images by using only the light components supplied from its own illumination means in a fixed condition associated with illumination. This is useful for cases where exact comparison of images is required that are photographed at different timing when, for example, magnified images are used for medical purposes.

The light shielding means may be configured in any manner. The positioning assistance means may combine with this function. In particular when the positioning assistance means is tubular in shape, it is easy to use the positioning assistance means as the light shielding means. The positioning assistance means in this case can shut out the light. The part of the object to be photographed is protected from external light while the objective lens is in the second range span and the positioning assistance means is abutted against the object. In this event, the positioning assistance means may be made of a material that is not transparent to the light. Alternatively, the light-shielding may be performed by subjecting at least one of the inner and outer surfaces of the positioning assistance means to a certain processing step.

For the camera having no illumination means or for the camera having illumination means which does not require to shoot magnified images under the exactly same illumination conditions, the positioning assistance means can be transparent to the light.

The camera of the present invention may further comprise display means for displaying an image built up by the image pickup means.

When shooting a magnified image, real-time confirmation of what a user is focusing on, if possible, helps the user to move the camera over the object/subject. For example, a camera having display means such as a liquid crystal display offers easy positioning of the region of which image is to be photographed as a magnified image, while he or she is looking at an image displayed thereon. This allows the user to shoot a magnified image easily. For example, when a camera used is the one having tubular positioning assistance means and the image built up by the image pickup means is displayed on a display unit as a real-time moving image, the user may move the opening provided at the end thereof to the object/subject that he or she wants to photograph while looking at the image displayed on the display means.

The camera of the present invention may be configured by using a unit for a camera as follows that can be attached to and removed from the camera.

The unit for a camera according to the present invention is a unit for a camera that is freely attached and removed to and from a camera comprising image pickup means to which the light from the object is directed and a housing to which the image pickup means is fitted, the image pickup means being for building up an image using the light from the object.

The unit for a camera is integrally formed of a tubular lens barrel; an objective lens through which the light from the object is directed to the image pickup means, the objective lens being contained in the lens barrel and movable along the optical axis of the light from the object at least between a first range span within which an image built up by the image pickup means is a demagnified image and a second range span within which an image built up by the image pickup means is a magnified image; and positioning assistance means having an opening formed therein at an end thereof on the optical axis, the end of the positioning assistance means being abutted against the object when the objective lens is in the second range span, the positioning assistance means being movable along the optical axis in such a manner that the end is located closer to the image pickup means when the objective lens is in the first range span than when it is in the second range span.

The objective lens and the positioning assistance means contained in the unit for a camera may be configured as in the above-mentioned camera. The unit for a camera may comprise at least one of the following components similar to those included in the above-mentioned camera: the illumination means, the light shielding means, the reference means, the manually-controlled means, and the display means.

The positioning assistance means in the unit for a camera is located at a position where the focal point of the objective lens falls on the opening when the objective lens is in the second range span. The opening may have a size that is generally equal to the size of the region within which objects can be built up by the image pickup means when the objective lens is in the second range span. In addition, the unit for a camera may be configured so that the distance that the objective lens travels between the first range span and the second range span is smaller than the distance that the positioning assistance means travels in association with the movement of the objective lens between the first range span and the second range span.

By using the unit for a camera as described above, a camera that is suited to shoot magnified images and demagnified images can be achieved by the camera containing the image pickup means to which the light from the object is directed and the housing to which the image pickup means is fitted wherein the image pickup means is for building up an image using the light from the object, which is convenient.

The unit for a camera may include the above-mentioned illumination means. A power supply for the illumination means may be, in this case, supplied from the camera to which it is attached. When the illumination means is achieved by optical fibers, a light source may be provided on or in the camera body to generate the light to be directed into the optical fibers.

BEST MODES FOR CARRYING OUT THE INVENTION

Figure 1:
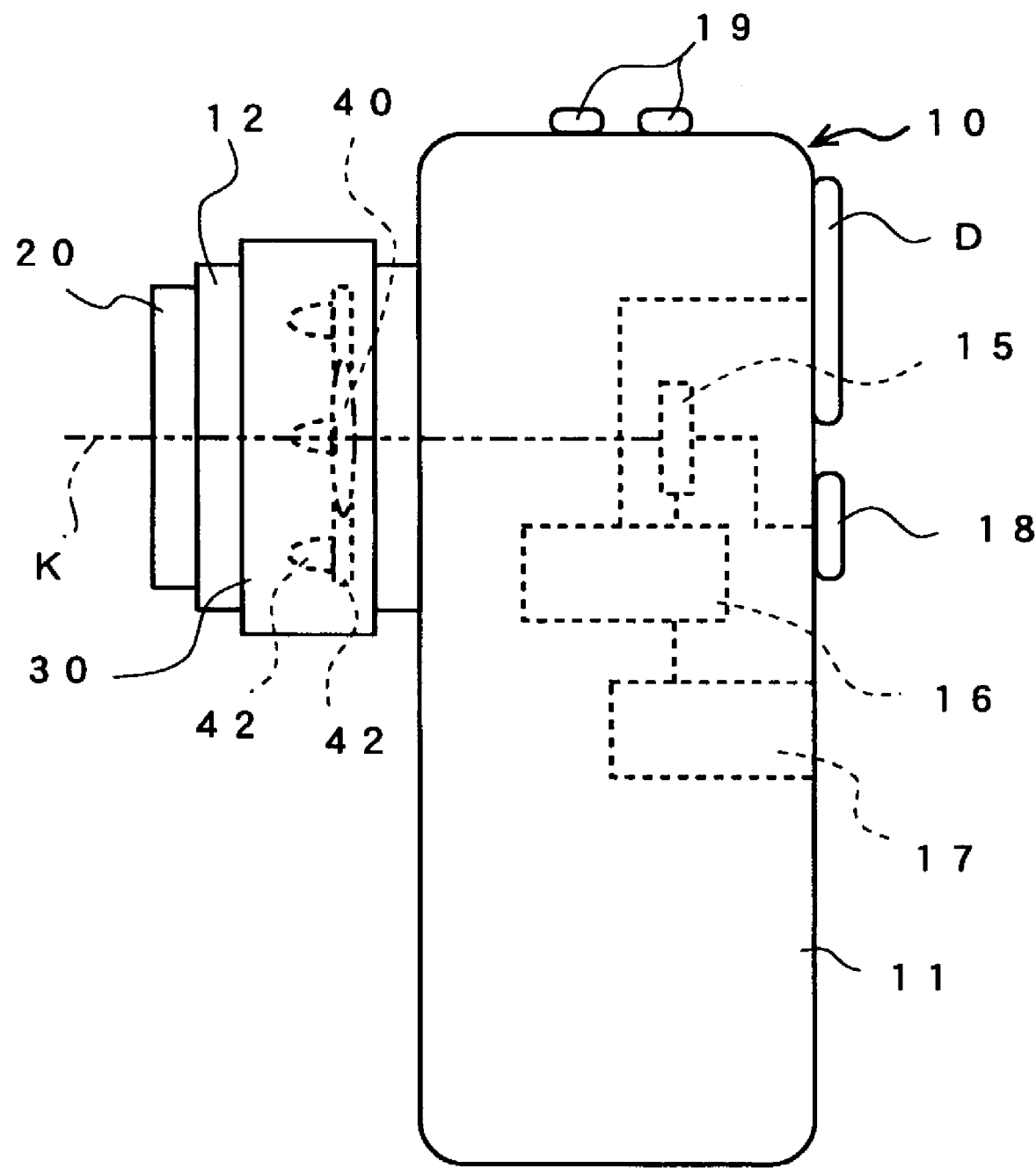
FIG. 1 is a perspective side view of a camera according to a first embodiment of the present invention.

Referring to the drawing, first and second embodiments of the present invention are described.

In the description of the embodiments, parts and components common to both are depicted by identical reference numerals. In addition, redundant description will be omitted.

First Embodiment

Figure 2:
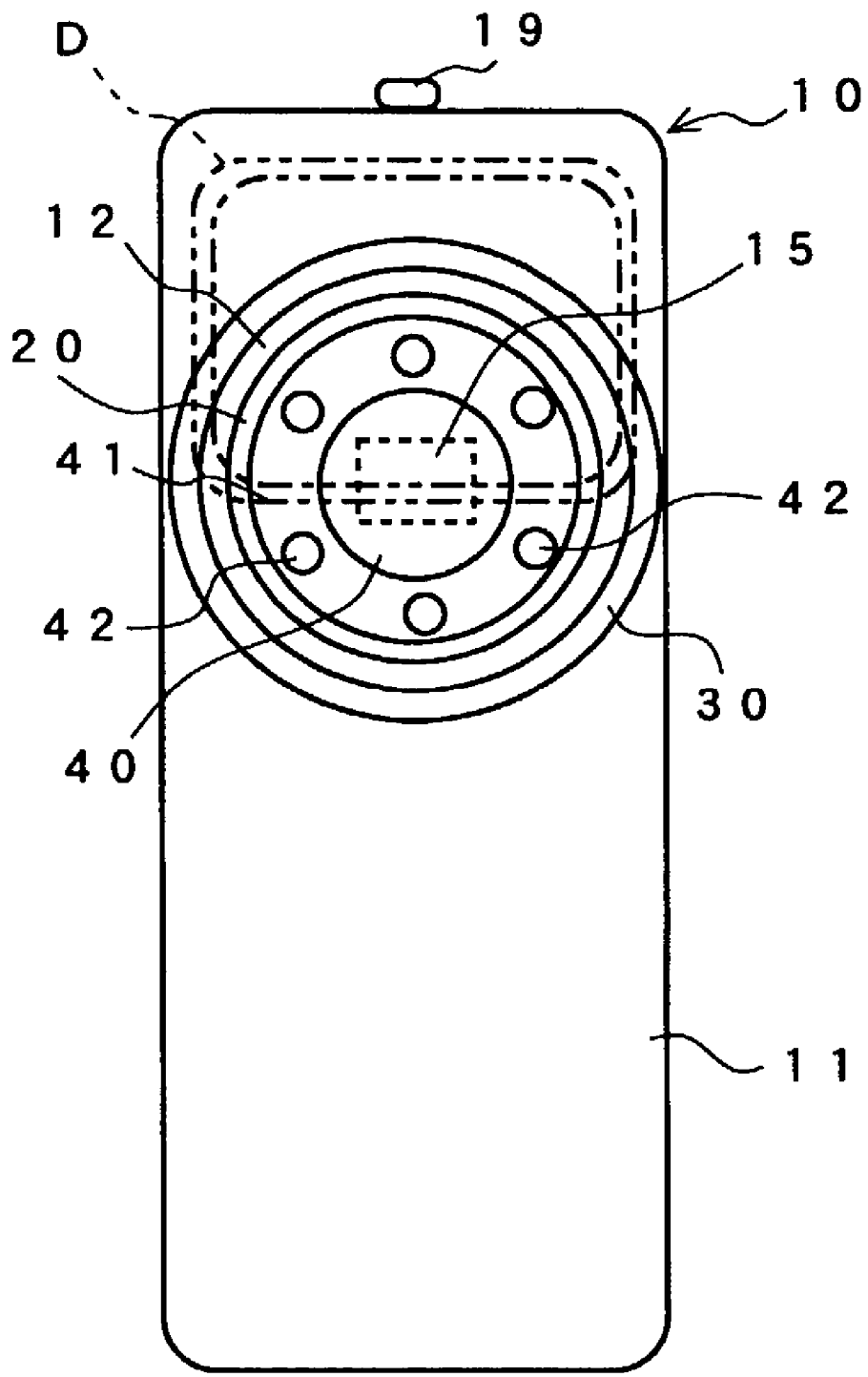
FIG. 2 is a front view of the camera shown in FIG. 1.

A camera according to this embodiment comprises a housing 10 to which various parts and components are fitted, as shown in the side view in FIG. 1 and the front view in FIG. 2.

This camera comprises a housing 10. The housing 10 in this embodiment comprises a generally rectangular parallelepiped housing body 11, and a hollow cylindrical lens barrel 12 that is projected from the front surface of the housing body 11. Both the housing 10 and the lens barrel 12 of this embodiment are not transparent to the light, which is not necessarily required. The housing 10 and the lens barrel 12 are made of, for example, an opaque material. Alternatively, they may be covered with an opaque layer (such as a layer formed by coloring with a coating).

The housing body 11 extends downward (the lower portion in FIGS. 1 and 2), which is not necessarily required. The extended portion has a shape for easy gripping by a user of a camera. The camera in this embodiment is a hand-held camera that is easy to use by users.

An abutted member 20 that corresponds to the positioning assistance means of the present invention is provided inside the lens barrel 12. In addition, a manually-controlled member 30 that corresponds to the manually-controlled means of the present invention is fitted around the lens barrel 12. The abutted member 20 and the manually-controlled member 30 in this embodiment are both formed into a tubular shape, and more specifically a hollow cylindrical shape.

The abutted member 20 in this embodiment is made so as not to be transparent to the light but not limited to. The abutted member 20 may be made of, for example, an opaque material. Alternatively, it may be covered with an opaque layer (such as a layer formed by coloring with a coating).

The abutted member 20 in the camera of this embodiment has the outside diameter which is generally equal to the inside diameter of the lens barrel 12. It can be inserted into and engaged with the lens barrel 12 with almost no gap therebetween.

On the other hand, manually-controlled member 30 has the inside diameter which is generally equal to the outside diameter of the lens barrel 12. It can be fitted around the lens barrel 12 with almost no gap therebetween.

The lens barrel 12, the abutted member 20 and the manually-controlled member 30 in such a relation are coaxial with each other. The axis which also is an optical axis K of the camera is shared among the lens barrel 12, the abutted member 20 and the manually-controlled member 30.

The manually-controlled member 30 is rotatable along the outer periphery of the lens barrel 12. The abutted member 20 moves back and forth in the direction of the optical axis K along with the rotation of the manually-controlled member 30. In this embodiment, the manually-controlled member 30 is moved either back or forth along the optical axis K depending on the rotation direction of the abutted member 20.

The abutted member 20 has an objective lens 40 fitted therein. The objective lens 40 of this embodiment is formed of, but not limited to, a single convex lens. The objective lens 40 is fixed to the inner surface of the abutted member 20 through a mount 41 secured to the inside of the abutted member 20. The mount 41 is a disk plate having the outer diameter which is equal to the inner diameter of the abutted member 20 and having a round opening in it at the center thereof. The objective lens 40 is secured to the mount 41 by engaging it to the opening in the mount 41. This fixes the objective lens 40 to the abutted member 20.

Six light sources 42 are provided on the front surface of the mount 41. The light sources 42 are each made up of, but not limited to, a small LED. Turning on and off of the light source 42 is controlled under the control of a controller which will be described later. More specifically, the light sources 42 are controlled so that it is supplied with electricity (light sources 42 are lit) while the objective lens 40 is in the second range span (described later) and it is disconnected from the power supply while the objective lens 40 is in other than that range span (light sources 42 are not lit). Thus, the light sources 42 illuminate at least the part of the object to be photographed while the objective lens 40 is in the second range span and the light sources 42 are lit.

The housing body 11 contains a CCD 15, a controller 16 and a recording medium 17 in the camera according to this embodiment. In addition, the housing body 11 is provided with an output terminal 18 and a display D on the back surface thereof. The housing body 11 is also provided with a control dial 19 on the top surface thereof.

The CCD 15 corresponds to the image pickup means in the present invention. The light from the object is guided from the object to the CCD 15 through the objective lens 40 along the optical axis K. Receiving the light, the CCD 15 builds up an image of the object and produces image data associated with the object image.

The display D corresponds to the display means in the present invention. It displays the image built up by the CCD 15. The display means may be configured in any manner as long as it can display images. In this embodiment, however, the display is a liquid crystal display.

The controller 16 has the function of performing predetermined image processing on an image signal that is generated when the CCD 15 builds up a predetermined image. The controller 16 in the camera of this embodiment includes, but not limited to, a computer, a ROM and a RAM. It is configured to provide the function to perform various processing by means of loading the program recorded on the ROM into the RAM and executing it. Details of the image processing to be performed by the controller 16 may be changed by means of, for example, modifying the above-mentioned program. For example, the controller 16 may perform switching between a static image and a moving image of the image to be produced or may perform adjustment of image quality including the adjustment of color, brightness, and contrast for these image data. The controller 16 also has the function of controlling images to be displayed on the above-mentioned display D. Images displayed on the display D under the control of the controller 16 may be either static images or moving images. However, a user who shoots an image may use it to determine the object/subject of which image is to be photographed. Taking this into consideration, it is preferable that the image is a real-time moving image of the object that is built up by the CCD 15 at that time.

The control dial 19 is an input device with which a camera user can enter details of the image processing to be performed by the controller 16 or information that is to be used to determine details of the display control for the display D. The control dial 19 is connected to the controller 16. The information entered by the user with the control dial 19 is supplied to the controller 16. The controller 16 carries out image processing and display control of the display D based on the information.

The recording medium 17 is for recording image data about an image that is built up. For example, it may be formed of a RAM. More specifically, it may be formed of a well-known memory card, a memory stick, or a video tape. The recording medium 17 in this embodiment can be attached to and removed from the housing body 11, which is not an essential requirement.

The output terminal 18 serves as an interface for the external output of the image signal that is generated by the controller 16. In this embodiment, the output terminal 18 may be connected to a predetermined display via a predetermined cable to display an image based on the picked-up image data on the display. The external output of the image signal is not necessarily made in a wired manner. It may be achieved in a wireless manner by using, for example, radio frequency as in infrared communications. The image data to be supplied outside may first be recorded on the above-mentioned recording medium 17 and then read out of it.

The controller 16 controls, according to the details of operation received through the control dial 19, whether the image signal about the picked up image is recorded on the recording medium 17, or is supplied outside through the output terminal 18, or both.

Next, a mechanism with which the abutted member 20 moves back and forth along the optical axis K along with the rotation of the manually-controlled member 30 is described with reference to FIG. 3.

Figure 3:
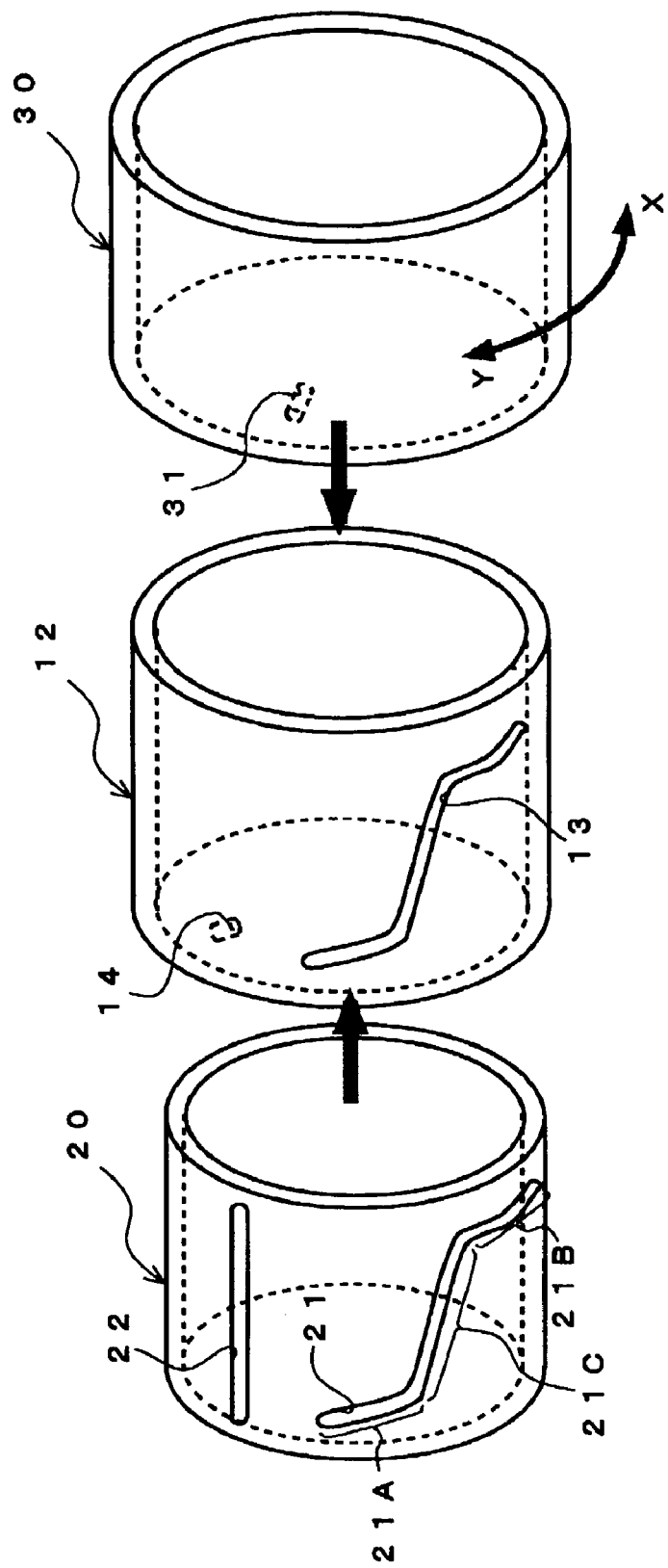
FIG. 3 is a view illustrating a structure of a lens barrel, an abutted member and a manually-controlled member in the camera shown in FIG. 1.

FIG. 3 is an exploded perspective view showing a structure of the lens barrel 12, the abutted member 20 and the manually-controlled member 30. The right side in the figure corresponds to the side of the housing body 11.

As shown in FIG. 3, the abutted member 20 has a generally S-shaped first slit 21 and a straight second slit 22. The first slit 21 and the second slit 22 are penetrating through the abutted member 20. The first slit 21 comprises a first angled portion 21A and a second angled portion 21B at both ends of the slit through which the amount of shift in the axial direction is small when moved by a certain distance along the periphery, and a middle angled portion 21C through which the amount of shift in the axial direction when moved by a certain distance along the periphery is larger than in the case of the first angled portion 21A and the second angled portion 21B.

Next, the lens barrel 12 is described. The lens barrel 12 has a third slit 13 formed therein. The third slit 13 is penetrating through the lens barrel 12. The third slit 13 has a shape corresponding to the above-mentioned first slit 21 in the abutted member 20. On the other hand, inner surface of the lens barrel 12 is provided with a first cam 14 that is formed into a solid cylindrical shape in this embodiment. The first cam 14 is attached to the inner surface of the lens barrel 12 at right angles. The length of it is equal to the thickness of the abutted member 20. The diameter of the first cam 14 corresponds to the width of the second slit 22 formed in the abutted member 20.

Next, the manually-controlled member 30 is described. A second cam 31 that is formed into a solid cylindrical shape in this embodiment is provided on the inner surface of the manually-controlled member 30. The second cam 31 is attached to the inner surface of the manually-controlled member 30 at right angles. The length of it is equal to the combined thickness of the lens barrel 12 and the abutted member 20. The diameter of the second cam 31 corresponds to the width of the first slit 21 formed in the abutted member 20 and the width of the third slit 13 formed in the lens barrel 12.

With the lens barrel 12, the abutted member 20 and the manually-controlled member 30 assembled together, the first cam 14 on the inner surface of the lens barrel 12 engages with the second slit 22 formed in the abutted member 20. Likewise, the second cam 31 on the inner surface of the manually-controlled member 30 passes through the third slit 13 formed in the lens barrel 12 and engages with the first slit 21 formed in the abutted member 20. The ends of the first cam 14 and the second cam 31 are aligned with the inner surface of the abutted member 20.

When the first cam 14 engaging with the second slit 22 is located at the leftmost end of the second slit 22 in the figure, the second cam 31 engaging with the first slit 21 is located at the leftmost end of the first slit 21 in the figure.

Because of this configuration, rotation of the manually-controlled member 30 causes the abutted member 20 to move back and forth in the direction of the optical axis K accordingly.

The forward and backward movement is described more in detail.

When the manually-controlled member 30 is rotated in the direction depicted by the symbol X in the figure, the second cam 31 on the manually-controlled member 30 also rotates in the direction depicted by the symbol X in the figure. The abutted member 20 having the first slit 21 engaging with the second cam 31 begins to rotate along with the rotation of the second cam 31. This rotation is, however, restricted due to the first cam 14 engaging with the second slit 22 formed on the abutted member 20. Accordingly, the abutted member 20 moves in a straight line to the left in the figure.

On the other hand, when the manually-controlled member 30 is rotated in the direction depicted by the symbol Y, an exact opposite to the above occurs. That is, when the manually-controlled member 30 is rotated in the direction depicted by the symbol Y, the abutted member 20 moves in a straight line to the right in the figure.

With the mechanism as described above, rotation of the manually-controlled member 30 results in straight movement of the abutted member 20 in the direction of the optical axis K with respect to the housing body 11 without rotation. In response to the movement of the abutted member 20 in the direction of the optical axis K, the objective lens 40 inside the abutted member 20 also moves in the direction of the optical axis K.

As described above, the first slit 21 comprises the first angled portion 21A, the second angled portion 21B and the middle angled portion 21C. If the manually-controlled member 30 is completely rotated in the direction depicted by the symbol Y or if it is almost completely rotated, the second cam 31 comes to the position of the above-mentioned first angled portion 21A. At this state, the objective lens 40 is closer to the CCD 15. An image produced on the CCD 15 at this state is a demagnified image.

On the other hand, if the manually-controlled member 30 is completely rotated in the direction depicted by the symbol X or if it is almost completely rotated, the second cam 31 comes to the position of the above-mentioned second angled portion 21B. At this state, the objective lens 40 is away from the CCD 15 as compared with the case when the second cam 31 is located at the first angled portion 21A. An image produced on the CCD 15 at this state is a magnified image.

In this embodiment, the objective lens 40 moves to a position suited to shoot a demagnified image when the second cam 31 comes to the position of the first angled portion 21A. The objective lens 40 moves to a position suited to shoot a magnified image when the second cam 31 comes to the position of the second angled portion 21B. In other words, in the camera according to this embodiment, the range allowable as the position of the objective lens 40 in the case where the second cam 31 is located at the first angled portion 21A corresponds to the first range span of the present invention. The range allowable as the position of the objective lens 40 in the case where the second cam 31 is located at the second angled portion 21B corresponds to the second range span of the present invention.

As described above, in the first angled portion 21A, the second angled portion 21B and the middle angled portion 21C, the amount of shift of the abutted member 20 in the axial direction when moved by a certain distance along the periphery is larger in the middle angled portion 21C than in the first angled portion 21A and the second angled portion 21B. This means that the amount of movement of the abutted member 20 is larger when the second cam 31 is located at the middle angled portion 21C than when the second cam 31 is located at the first angled portion 21A or the second angled portion 21B obtained as a result that the manually-controlled member 30 is rotated at the same angle.

In the camera of this embodiment, the amount of movement of the objective lens 40 as a result of the movement of the manually-controlled member 30 by a given amount is smaller the objective lens 40 in the first range span and the second range span than when it is out of the first range span and the second range span. Because of this configuration, precise positioning of the objective lens (which positioning is made mainly for focusing) can be made more easily in the first range span and the second range span in which demagnified and magnified images are to be photographed using this camera.

In the camera according to this embodiment, the abutted member 20 moves to the right in FIG. 3 until it is contained in the lens barrel 12 when the second cam 31 is located at the first angled portion 21A of the first slit 21, that is, when the objective lens 40 is in the first range span suitable for shooting a demagnified image.

In this camera, the abutted member 20 extends out of the lens barrel 12 when the second cam 31 is located at the second angled portion 21B of the first slit 21, that is, when the objective lens 40 is in the second range span suitable for shooting a magnified image.

The length of the part of the abutted member 20 extended and that in the direction of the optical axis K are determined so that the center of the circle formed by the end of the abutted member 20 is within the focal depth of the objective lens 40 in the second range span. In the camera of this example, when the end of the abutted member 20 is abutted against the object in shooting a magnified image, the focal point of the objective lens 40 falls on the center of the circle formed by the end of the abutted member 20.

A larger focal depth of the objective lens 40 on the object side may be used in order to eliminate strict requirements for precise focusing. To this end, an aperture may be provided between the objective lens 40 and the CCD 15 for example to control the amount of the field of view. The aperture may be varied in size to change the amount of the field of view.

The abutted member 20 in the camera according to this embodiment has the inner diameter that prevents it from appearing in the field of view of the objective lens 40 when the objective lens 40 is in either the first range span or the second range span. The objective lens 40 in the first range span is retracted toward the CCD 15 as described above. Accordingly, there is a higher possibility of the abutted member 20 located in front of it appearing in the field of view. However, the abutted member 20 is contained in the lens barrel 12 as described above while the objective lens 40 is in the second range span. This makes it difficult for the abutted member 20 to appear in the field of view of the objective lens 40, avoiding the necessity of increasing the size of the inner diameter of the abutted member 20 unnecessarily.

Next, the way of using this camera is described.

A user first determines whether he or she wants to shoot a demagnified image or a magnified image using this camera.

The camera is available for both moving images and static images. Accordingly, the user should also determine whether he or she shoots a moving image or a static image. It is also necessary to determine whether image quality should be adjusted. The user supplies the information associated with such determination to the camera by controlling the control dial 19 during or prior to shooting an image.

In order to shoot a demagnified image, the user rotates the manually-controlled member 30 in the direction depicted by the symbol Y in FIG. 3. This causes the objective lens 40 to move to the first range span that is closer to the CCD 15. The abutted member 20 is contained within the lens barrel 12. As described above, image pickup that is carried out in this state is for shooting a demagnified image.

Images are photographed by the user after he or she turns the lens barrel 12 toward the object. The light from the object is then directed to the CCD 15 through the objective lens 40. The CCD 15 builds up a demagnified image using this light from the object.

The user may rotate the manually-controlled member 30 if necessary while keeping the objective lens 40 in the first range span. This causes the objective lens 40 to move back and forth relative to the CCD 15, adjusting the focus to shoot a demagnified image.

This is how the demagnified image is photographed.

On the other hand, in order to shoot a magnified image, the user rotates the manually-controlled member 30 in the direction depicted by the symbol X in FIG. 3. This causes the objective lens 40 to move and reach the second range span that is relatively far from the CCD 15. The camera is then ready for shooting a magnified image. In this state, the abutted member 20 extends out of the lens barrel 12. The light sources 42 are supplied with electricity.

In this state, the user abuts the end of the abutted member 20 against the object so that the part of the object that he or she wants to photograph comes to, for example, the center of the circle formed by end of the abutted member 20. As described above, the center of the circle formed by the end of the abutted member 20 is in the focal depth on which the objective lens 40 in the second range span can be focused. Accordingly, a magnified image of the object can automatically be made in focus merely by positioning the part of the object to be photographed at the center of the circle formed by the end of the abutted member 20. The image pickup can be made with the abutted member 20 abutted against the periphery of the area to be photographed. Thus, the magnified image can be photographed using a steady camera with no problem of camera shake.

During the image pickup, the illuminated light from the above-mentioned light sources 42 is directed to at least the area to be photographed. Therefore, illuminance required for shooting an image can be obtained without using any other lighting equipment. Images can thus be photographed, with the external light shut out by the abutted member 20 and with only the light components supplied from the light sources 42 used as illumination light, maintaining the fixed condition associated with illumination.

If the area to be photographed is not selected well, the user may move the camera along the object while keeping the abutted member 20 abutted against the object for example. The user may use an image on the display D as a reference.

The user may rotate the manually-controlled member 30 if necessary while keeping the objective lens 40 in the second range span. This allows the user to adjust focusing for shooting a magnified image.

In response to the light from the object guided to the CCD 15 through the objective lens 40 in the manner described above, the CCD 15 builds up a magnified image.

This is how the magnified image is photographed.

For either photographing a magnified image or photographing a demagnified image, the image data created by the CCD 15 are subjected to proper image processing by the controller 16 according to the operation that the user made using the control dial 19. The image data are recorded on the recording medium 17 or are supplied outside via the output terminal 18, according to the information supplied by the user through the operation of the control dial 19.

Next, a modified version of the camera according to the above-mentioned first embodiment is described.

In the above-mentioned camera, the abutted member 20 is secured to the objective lens 40 via the mount 41. The abutted member 20 and the objective lens 40 are moved by equal distances. However, it is not essential for the abutted member 20 and the objective lens 40 to be moved by equal distances. One may travel a longer distance than the other. The direction of movement is not necessarily identical. Control of the manually-controlled member 30 may move the abutted member 20 and the objective lens 40 in opposite directions to each other.

The modified camera allows, for example, separate and independent movement of the abutted member 20 and the objective lens 40. Such separate and independent movement of the abutted member 20 and the objective lens 40 can be achieved easily by means of moving at least one of the abutted member 20 and the objective lens 40 using predetermined driving means such as a motor or others.

In the above-mentioned camera, the objective lens is moved in an optical system in order to make it possible to shoot magnified images and demagnified images. In the above-mentioned camera, the objective lens 40 is the only component that moves. The objective lens is only required to move to satisfy the following equation between the object and the CCD 15: $(1/a)+(1/b)=(1/f)$ (wherein "a" represents the distance between the object and the objective lens 40, "b" represents the distance between the objective lens 40 and the CCD 15, and "f" represents the focal distance of the objective lens).

Such a configuration may be employed to allow the movement of not only the objective lens 40 but also the CCD 15, provided that this condition is satisfied or it is more reasonable to satisfy this condition. The movement of the CCD 15 in this state may be made manually using a mechanical mechanism or may be made using predetermined power.

Another modification is as follows.

Figure 4:
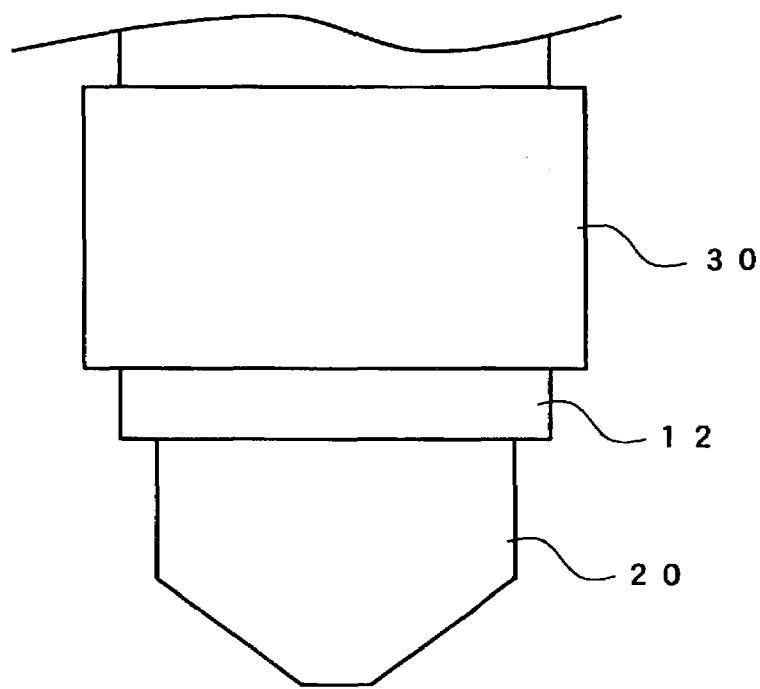
FIG. 4 is a side view illustrating a modification of the abutted member in the camera shown in FIG. 1.
Figure 5:
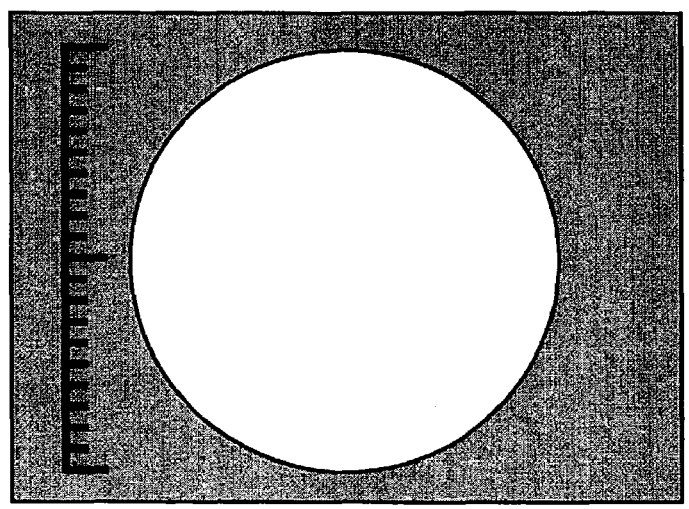
FIG. 5 is a view illustrating an example of an image that is photographed with the camera having the abutted member shown in FIG. 4.

While the above-mentioned camera has a hollow cylindrical abutted member 20, the shape of the abutted member 20 may be modified as, for example, a generally circular cone having an opening formed in it at the end thereof, as shown in FIG. 4. When the abutted member 20 is tapered at the end thereof, the diameter of the opening formed in the end may have a size with which the inner edge of the abutted member 20 slightly overlaps the outer periphery of the part of the object to be photographed while the objective lens 40 is in the second range span. A scale which is not shown may be provided with predetermined readings on the inner surface of the end of the abutted member 20. The scale serves as an indication with which the user can find out an approximate size of the object by comparing the scale with the part of the object to be photographed in a subject. It corresponds to the reference means of the present invention. An example of an image photographed with the camera having the abutted member 20 in this example is shown in FIG. 5. In FIG. 5, a hatched portion corresponds to the inside of the abutted member 20 and those indicated on the left of the hatched portion in FIG. 5 are readings included in the image.

The objective lens 40, the abutted member 20, the manually-controlled member 30, the light sources 42 and the mount 41 in the above-mentioned example may freely be attached to and removed from the housing body 11. A combination of them with the lens barrel 12 may freely be attached to and removed from the housing body 11. In such a case, a locking member that fixes the lens barrel 12 and the housing body 11 to each other in a releasable manner may be provided on or in both the lens barrel 12 and the housing body 11. The objective lens 40, the abutted member 20, the manually-controlled member 30, the light sources 42, the mount 41 and the lens barrel 12 may be integrally formed as a whole. The objective lens 40, the abutted member 20, the manually-controlled member 30, the light sources 42 and the mount 41 (as a case may be, along with the lens barrel 12) may be integrally formed into a unit. Such a unit may be attached to the camera body for use as though a typical magnification lens unit were used that comprises a lens contained in a lens barrel. In this way, it may be used with an ordinary camera as an attachment, which is advantageous for users in terms of ease of use.

Second Embodiment

A camera according to the second embodiment is similar in configuration to the camera described in conjunction with the first embodiment.

The camera of the second embodiment also comprises a housing body 11 to which various parts and components are fitted, as in the camera of the first embodiment.

A housing 10 of the second embodiment is also not transparent to the light.

The housing body 11 contains a CCD 15, a controller 16 and a recording medium 17. The housing body 11 is provided with an output terminal 18 and a display D on the back surface thereof. The housing body 11 is also provided with a control dial 19 on the top surface thereof. They are all similar to those described in conjunction with the camera of the first embodiment.

The camera according to the second embodiment comprises a lens barrel 12, an abutted member 20, a manually-controlled member 30, an objective lens 40 and a light source 42. They are integrally formed into a unit. This unit can freely be attached to and removed from the housing body 11. By attaching this unit to the housing body 11, the camera becomes available for both magnified images and demagnified images. The abutted member 20 and the lens barrel 12 are not transparent to the light as in the first embodiment.

In this embodiment, the objective lens 40 and the abutted member 20 can be advanced and retracted along the optical axis K. As in the camera of the first embodiment, the objective lens 40 may be located in the first range span and the second range span. On the other hand, the abutted member 20 may be advanced and retracted along the optical axis K. However, in this embodiment, the objective lens 40 and the abutted member 20 are not fixed to each other. Accordingly, the objective lens 40 and the abutted member 20 may be advanced and retracted at different distances from each other.

The abutted member 20 is moved in cooperation with the movement of the objective lens 40. A mechanism of this will be described later.

Figure 6:
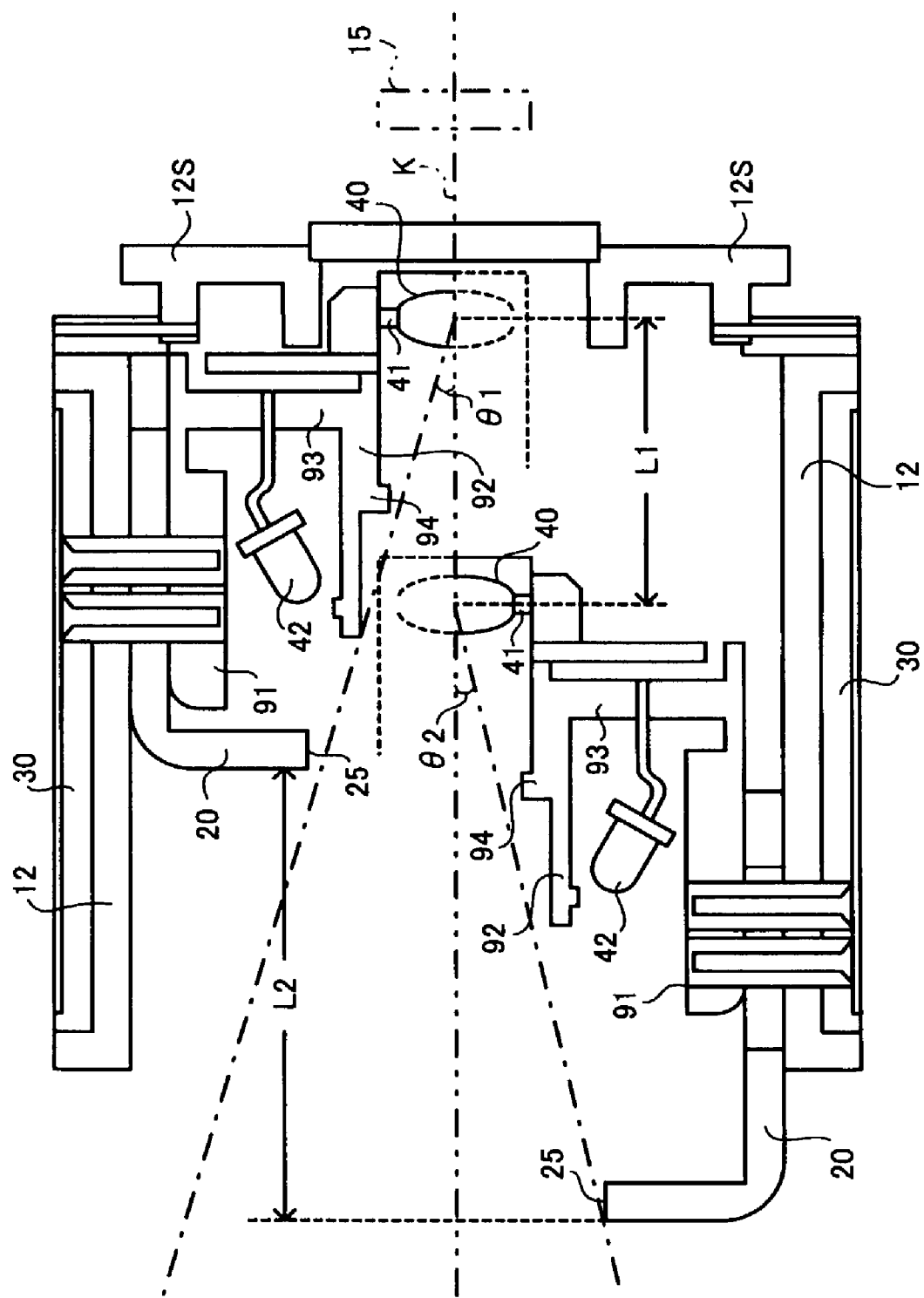
FIG. 6 is a side cross-sectional view illustrating a structure around a lens barrel and its movement in a camera according to a second embodiment of the present invention.
Figure 7:
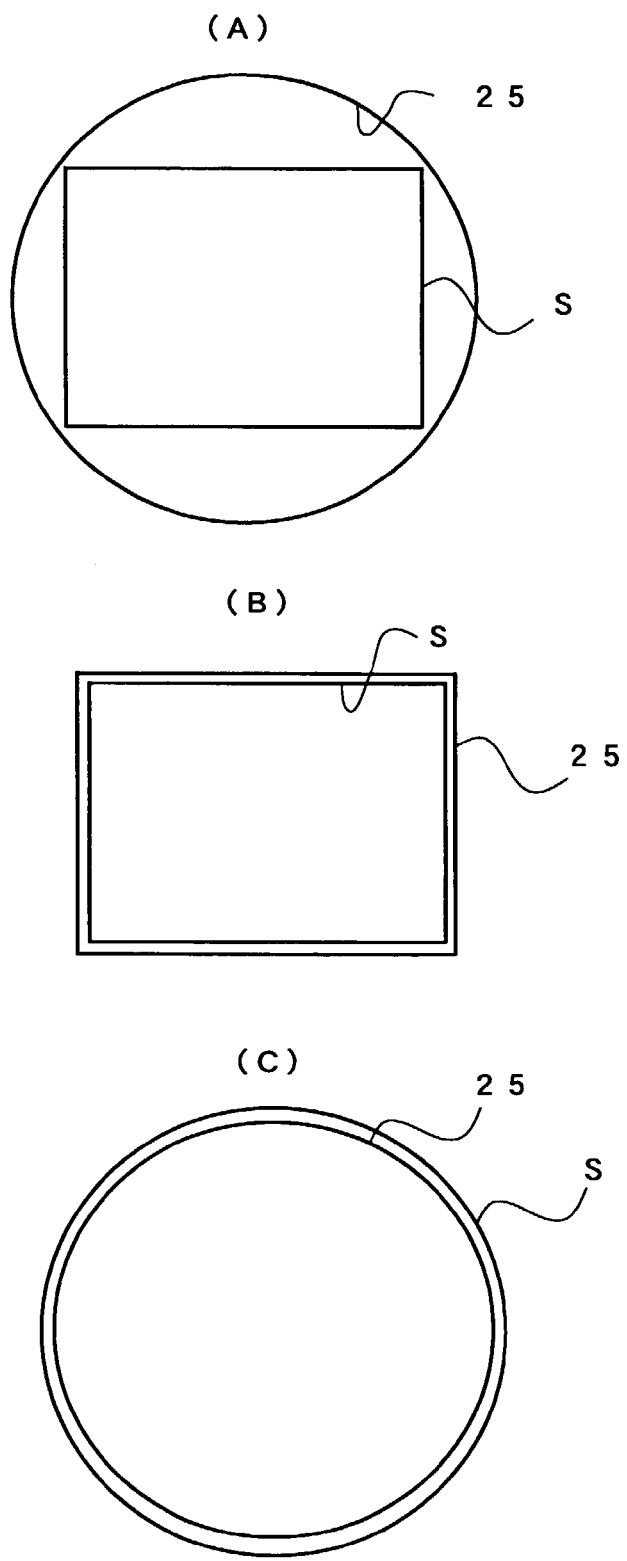
FIG. 7 is a view illustrating a relation between an opening in the camera shown in FIG. 6 and an area to be photographed.
Figure 8:
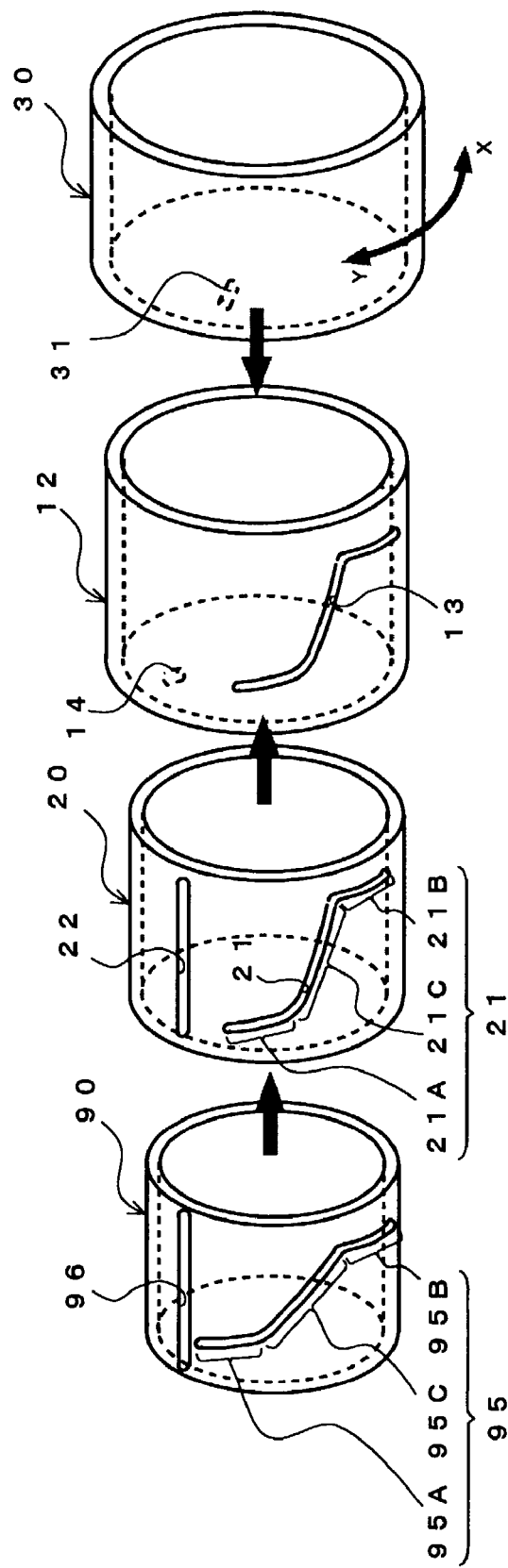
FIG. 8 is a view illustrating a structure of a lens barrel, an abutted member, a manually-controlled member and an objective lens support of the camera shown in FIG. 6.

More specifically, this unit is configured as shown in FIGS. 6, 7, and 8.

A cross-section of this unit is shown in FIG. 6. The portion above the optical axis K in FIG. 6 corresponds to the state where the objective lens 40 is located in the first range span for shooting a demagnified image. The portion below the optical axis K corresponds to the state where the objective lens 40 is in the second range span for shooting a magnified image.

The unit comprises, as shown in FIG. 6, the lens barrel 12, the abutted member 20, the manually-controlled member 30, and an objective lens support 90. They are all formed into a generally hollow cylindrical shape and aligned coaxially.

The lens barrel 12 has a junction 12S at the base thereof. The junction 12S has the function to join the housing body 11 and the lens barrel 12 with each other. It comprises a locking member which is not shown. The locking member is for removably locking another locking member (not shown) that is provided on or in the housing body 11. With the locking members, the unit can freely be attached to and removed from the housing body 11.

The middle portion of the lens barrel 12 has a smaller thickness in the radial direction than the top end and the base.

The outer diameter of the abutted member 20 is equal to the inner diameter of the lens barrel 12. The abutted member 20 is inserted into and engaged to the lens barrel 12. As described above, the abutted member 20 can be advanced and retracted along the optical axis K. The advancement and retraction are made in parallel to the lens barrel 12.

The end of the tubular abutted member 20 has the edge that is bent inward to provide a plane. An opening 25 is formed in it at the center of the plane. The opening 25 has a size that is generally equal to the region within which objects can be photographed by the CCD 15 when the objective lens 40 is in the second range span.

In this embodiment the opening 25 and the region within which objects can be photographed by the CCD 15 when the objective lens 40 is in the second range span are in the relation as shown in FIG. 7(A). More specifically, the area to be photographed S in this embodiment is rectangular and the opening 25 has a round shape that is inscribed with the area to be photographed S. The relation between the area to be photographed S and the opening 25 is not limited thereto. For example, as shown in FIG. 7(B), the area to be photographed S may be rectangular and the opening 25 may also be rectangular that conforms with the outer periphery of the area to be photographed S. As shown in FIG. 7(C), the area to be photographed S may be round and the opening 25 may also be round that conforms with the outer periphery of the area to be photographed S. When the edge of the opening 25 conforms with the outer periphery of the area to be photographed S, the edge of the opening 25 may (FIG. 7(C)) or may not (FIG. 7(B)) appear in the outer periphery of the area to be photographed S.

The objective lens support 90 is provided inside the abutted member 20. The objective lens support 90 in this embodiment is generally hollow cylindrical in shape. The objective lens support 90 moves back and forth in the direction of the optical axis K while supporting the objective lens 40.

The objective lens support 90 in this embodiment comprises an outer cylinder 91 and an inner cylinder 92, which are joined to each other via a connection plate 93. The lens support 90 in this embodiment is formed as a unit. The outer cylinder 91 and the inner cylinder 92 are generally hollow cylindrical in shape and are aligned coaxially. The connection plate 93 is a donut-shaped plate member that is used to connect the outer cylinder 91 and the inner cylinder 92 to each other.

An aperture 94 is provided in the inner surface of the inner cylinder 92. The aperture 94 is formed by extending a part of the inner surface of the objective lens support 90 inwardly like a rib.

A mount 41 which is similar to the one in the first embodiment is fixed to the inside of the objective lens support 90. The objective lens 40 is fixed to the mount 41 and is thus fixed to the objective lens support 40. The objective lens in this embodiment is formed of, but not limited to, a single convex lens.

Multiple light sources 41 are provided on the connection plate 93 of the objective lens support 90, facing to the opening 25. The light sources 41 are similar to those described in conjunction with the first embodiment and are achieved by small LEDs. The light sources 41 are controlled, as in the first embodiment, to be supplied with electricity while the objective lens 40 is in the second range span and to be disconnected from the power supply while the objective lens 40 is in other than that range span. At least the part of the object to be photographed is illuminated by the light from the light sources when the objective lens 40 is in the second range span.

The manually-controlled member 30 is fitted around that lens barrel 12. The manually-controlled member 30 is hollow cylindrical in shape and is engaged with the above-mentioned thin portion of the lens barrel 12.

The manually-controlled member 30 is rotatable along the outer periphery of the lens barrel 12. Rotation of the manually-controlled member 30 results in forward and backward movement of the abutted member 20 and the objective lens support 90 in the direction of the optical axis K. The abutted member 20 and the objective lens support 90 in this embodiment are moved forward always in the same direction. The direction is determined depending on the direction of rotation of the manually-controlled member 30.

The mechanism that the abutted member 20 and the objective lens support 90 moves back and forth in the direction of the optical axis K along with the rotation of the manually-controlled member 30 is similar to the one as described in conjunction with the camera of the first embodiment.

As shown in FIGS. 6 and 8, the abutted member 20 has a generally S-shaped first slit 21 and a straight second slit 22 which are similar to those used in the first embodiment. The first slit 21 comprises, as in the first embodiment, a first angled portion 21A, a second angled portion 21B and a middle angled portion 21C.

The lens barrel 12 has a third slit 13 as in the first embodiment. A first cam 14 is provided on the inner surface of the lens barrel 12 as in the first embodiment.

The objective lens support 90 has a generally S-shaped fourth slit 95. The fourth slit 95 penetrates through the outer cylinder 91 of the objective lens support 90. The fourth slit 95 comprises a first angled portion 95A and a second angled portion 95B at both ends of the slit through which the amount of shift in the axial direction is small when moved along the periphery, and a middle angled portion 95C through which the amount of shift in the axial direction when moved along the periphery is larger than in the case of the first angled portion 95A and the second angled portion 95B. The inclined angle of the middle angled portion 95C is determined such that the amount of shift in the axial direction when moved by a certain distance along the periphery is smaller than the amount of shift of the first slit 21 in the abutted member 20 at the middle angled portion 21C. The outer cylinder 91 also has a fifth slit 96 formed therein. The fifth slit 96 is a straight slit along with axial direction of the objective lens support 90. This slit penetrates through the outer cylinder 91.

As in the first embodiment, a second cam 31 that is formed into a solid cylindrical shape is provided on the inner surface of the manually-controlled member 30. The second cam 31 is attached to the inner surface of the manually-controlled member 30 at right angles. The length of it is equal to the sum of the thickness of the lens barrel 12, the abutted member 20 and the outer cylinder 91. The diameter of the second cam 31 corresponds to the width of the first slit 21 formed in the abutted member 20, the width of the third slit 13 formed in the lens barrel 12, and the width of the fourth slit 95 formed in the objective lens support 90.

With the lens barrel 12, the abutted member 20 and the manually-controlled member 30 assembled together, the first cam 14 on the inner surface of the lens barrel 12 engages with the second slit 22 formed in the abutted member 20. Likewise, the second cam 31 on the inner surface of the manually-controlled member 30 passes through the third slit 13 formed in the lens barrel 12 and the first slit 21 formed in the abutted member 20. It engages with the third slit 13 and the fourth slit 95. The ends of the first cam 14 and the second cam 31 are aligned with the inner surface of the outer cylinder 91 of the objective lens support 90.

When the first cam 14 engaging with the second slit 22 is located at the leftmost end of the second slit 22 in FIG. 8, the second cam 31 engaging with the first slit 21 is located at the leftmost end of the first slit 21 in FIG. 8.

Because of this configuration, rotation of the manually-controlled member 30 causes the abutted member 20 and the objective lens support 90 to move back and forth in the direction of the optical axis K accordingly.

The forward and backward movement is described more in detail.

When the manually-controlled member 30 is rotated in the direction depicted by the symbol X in FIG. 8, the second cam 31 on the manually-controlled member 30 also rotates in the direction depicted by the symbol X in FIG. 8. The abutted member 20 having the first slit 21 engaging with the second cam 31 begins to rotate along with the rotation of the second cam 31. This rotation is, however, restricted due to the first cam 14 engaging with the second slit 22 formed on the abutted member 20. Accordingly, the abutted member 20 moves in a straight line to the left in FIGS. 6 and 8.

At the same time, the objective lens support 90 having the fourth slit 95 and engaging with the second cam 31 moves in a straight line to the left in FIGS. 6 and 8, in response to the rotation of the second cam 31 in the direction depicted by the symbol X along the rotation of the manually-controlled member 30 in the direction depicted by the symbol X. Since the second cam 31 is engaging with the fifth slit 96, the objective lens support 90 is pushed to the left in FIGS. 6 and 8 without rotation about the optical axis K, as in the abutted member 20.

On the other hand, when the manually-controlled member 30 is rotated in the direction depicted by the symbol Y in FIG. 8, movement in the opposite direction occurs.

The abutted member 20 moves in a straight line to the left in FIGS. 6 and 8. The objective lens support 90 moves in a straight line to the left in FIGS. 6 and 8.

Because of the above-mentioned mechanism, rotation of the manually-controlled member 30 causes the abutted member 20 and the objective lens support 90 to move in a straight line in the direction of the optical axis K. The movement of the objective lens support 90 and the movement of the objective lens support 90 provided therein (and the objective lens 40 fixed thereto) are made in cooperation with each other.

On the other hand, if the manually-controlled member 30 is completely rotated in the direction depicted by the symbol X or if it is almost completely rotated, the second cam 31 comes to the position of the above-mentioned second angled portion 21B. At this state, the objective lens 40 is away from the CCD 15 as compared with the case when the second cam 31 is located at the first angled portion 21A. An image produced on the CCD 15 at this state is a magnified image.

If the manually-controlled member 30 is completely rotated in the direction depicted by the symbol Y or if it is almost completely rotated, the second cam 31 comes to the position of the first angled portion 21A of the first slit 21 and the first angled portion 95A of the fourth slit 95. At this state, the objective lens 40 is closer to the CCD 15. An image produced on the CCD 15 at this state is a demagnified image.

In the camera according to this embodiment, the objective lens 40 moves to a position suited to shoot a demagnified image when the second cam 31 comes to the position of the first angled portion 21A in response to the operation of the manually-controlled member 30. The objective lens 40 moves to a position suited to shoot a magnified image when the second cam 31 comes to the position of the second angled portion 21B. In other words, in the camera according to this embodiment, the range allowable as the position of the objective lens 40 in the case where the second cam 31 is located at the first angled portion 21A corresponds to the first range span of the present invention. The range allowable as the position of the objective lens 40 in the case where the second cam 31 is located at the second angled portion 21B corresponds to the second range span of the present invention.

The amount of movement of the abutted member 20 when the manually-controlled member 30 is rotated at the same angle is identical to that in the first embodiment. The amount of movement of the objective lens 40 as a result of the movement of the manually-controlled member 30 by a given amount is smaller the objective lens 40 in the first range span and the second range span than when it is out of the first range span and the second range span.

In the camera according to this embodiment, as in the first embodiment, the abutted member 20 is contained in the lens barrel 12 when the objective lens 40 is in the first range span suitable for shooting a demagnified image.

In this camera, the abutted member 20 extends out of the lens barrel 12 when the second cam 31 is located at the second angled portion 21B of the first slit 21, that is, when the objective lens 40 is in the second range span suitable for shooting a magnified image. In this event, the center of the opening 25 at the end of the abutted member 20 falls within the range of the focal depth of the objective lens 40. In the camera in this example, in shooting a magnified image, the focal point of the objective lens 40 automatically falls on the object in the opening 25 when the end of the abutted member 20 is abutted against the object.

As described above, the inclination of the middle angled portion 95C of the fourth slit 95 provided in the objective lens support 90 in the camera of this embodiment is determined in such a manner that the amount of shift in the axial direction when moved by a certain distance along the periphery is smaller than the amount of shift of the middle angled portion 21C of the first slit 21 provided in the abutted member 20.

Therefore, when the manually-controlled member 30 is rotated, an amount of shift L1 of the objective lens support 90 in the direction of the optical axis K is smaller than an amount of shift L2 of the abutted member 20. This indicates that the abutted member 20 is retracted more than the objective lens 40 when the objective lens 40 moves from the second range span to the first range span. Therefore, as shown in FIG. 6, a viewing angle (angle of view) θ1 of the objective lens 40 in the first range span is larger than a viewing angle θ2 of the objective lens 40 in the second range span. In the camera of this embodiment, it is easy to enlarge the viewing angle in shooting a demagnified image that results in a larger field of view.

The way of using this camera is similar to the one as described in conjunction with the camera of the first embodiment.

In the camera according to the second embodiment, the objective lens 40 is only required to move to satisfy the following equation between the object and the CCD 15: $(1/a)+(1/b)=(1/f)$ (wherein "a" represents the distance between the object and the objective lens 40, "b" represents the distance between the objective lens 40 and the CCD 15, and "f" represents the focal distance of the objective lens 40). Such a configuration may be employed to allow the movement of not only the objective lens 40 but also the CCD 15.

INDUSTRIAL APPLICABILITY

As apparent from the above, the present invention provides a camera that is suited for shooting both demagnified images and magnified images.

The invention claimed is:

1. A camera comprising an objective lens; and image pickup means for building up an image using the light from an object, the light from the object being adapted to be directed to the image pickup means through said objective lens, wherein:
   said objective lens is movable along the optical axis of said light from the object at least between, a first range span within which an image built up by the image pickup means is a demagnified image and a second range span within which an image built up by the image pickup means is a magnified image;
   the camera further comprises positioning assistance means having an opening formed therein at an end thereof on said optical axis, the end of the positioning assistance means being abutted against the object only when said objective lens is in said second range span, the positioning assistance means being movable along the optical axis in such a manner that the end is located closer to the image pickup means when said objective lens is in said first range span than when it is in said second range span; and that
   said positioning assistance means is located at a position where the focal point of said objective lens falls on said opening when said objective lens is in said second range span, said opening having a size that is generally equal to that of the region within which objects can be built up by said image pickup means when said objective lens is in said second range span; and
   a manually-controlled means that is movable from a first position to a second position to correspondingly move said objective lens from said first range span to said second range span, in which the amount of movement of said objective lens in response to the movement of said manually-controlled means is smaller when said objective lens is inside said first range span and said second range span than when it is outside said first range span and said second range span.

2. The camera as claimed in claim 1, wherein the region within which objects can be built up by said image pickup means when said objective lens is in said second range span is rectangular in shape and said opening is round in shape, said region is generally inscribed in the opening.

3. The camera as claimed in claim 1, wherein said opening generally conforms with the outer periphery of said region within which objects can be built up by said image pickup means.

4. The camera as claimed in claim 1, wherein the position of said positioning assistance means is where the edge of said opening does not appear in front of a film plane of said image pickup means when said objective lens is in said first range span.

5. The camera as claimed in claim 1, wherein said positioning assistance means is tubular in shape and has said opening formed therein at an end thereof.

6. The camera as claimed in claim 5, further comprising illumination means for illuminating at least the part of the object to be photographed by exposing an inside area of said opening to the light when said objective lens is in said second range span,
   the illumination means being disposed within said positioning assistance means.

7. The camera as claimed in claim 1, further comprising illumination means for illuminating at least the part of the object to be photographed by exposing an inside area of said opening to the light when said objective lens is in said second range span.

8. The camera as claimed in claim 7, wherein said illumination means lights up only when said objective lens is in said second range span.

9. The camera as claimed in claim 7, wherein said positioning assistance means shuts out the light and the part of the object to be photographed is protected from the external light when said objective lens is in said second range span and when said positioning assistance means is abutted against said object.

10. The camera as claimed in claim 1, further comprising light shielding means that is configured to protect the part of the object to be photographed from external light when said objective lens is in said second range span and when said positioning assistance means is abutted against said object.

11. The camera as claimed in claim 1, wherein said objective lens is moved in cooperation with said positioning assistance means.

12. The camera as claimed in claim 1, wherein said objective lens is movable along said optical axis over a range of at least one of said first range span and said second range span.

13. The camera as claimed in claim 1, wherein said manually-controlled means is fitted around said lens barrel which is tubular in shape in such a manner that said positioning assistance means moves in the axial direction of said lens barrel through the rotation of it.

14. The camera as claimed in claim 1, further comprising display means for displaying an image built up by the image pickup means.

15. A camera comprising a tubular lens barrel; an object lens contained in said lens barrel; and image pickup means for building up an image using the light from an object, the light from the object being adapted to be directed to the image pickup means through said objective lens, wherein:
   said objective lens is movable along the optical axis of said light from the object at least between a first range span within which an image built up by the image pickup means is a demagnified image and a second range span within which an image built up by the image pickup means is a magnified image;
   the camera further comprises positioning assistance means having an opening formed therein at an end thereof on said optical axis, the end of the positioning assistance means being abutted against the object only when said objective lens is in said second range span, the positioning assistance means being movable along the optical axis in such a manner that the end is located closer to the image pickup means when said objective lens is in said first range span than when it is in said second range span; and that
   said positioning assistance means is located at a position where the focal point of said objective lens falls on said opening when said objective lens is in said second range span, said opening having a size that is generally equal to that of the region within which objects can be built up by said image pickup means when said objective lens is in said second range span; and
   a manually-controlled means that is movable from a first position to a second position to correspondingly move said objective lens from said first range span to said second range span, in which the amount of movement of said objective lens in response to the movement of said manually-controlled means is smaller when said objective lens is inside said first range span and said second range span than when it is outside said first range span and said second range span.

16. A camera comprising an objective lens; and image pickup means for building up an image using the light from an object, the light from the object being adapted to be directed to the image pickup means through said objective lens, wherein:
said objective lens is movable along the optical axis of said light from the object at least between a first range span within which an image built up by the image pickup means is a demagnified image and a second range span within which an image built up by the image pickup means is a magnified image;
the camera further comprises positioning assistance means having an opening formed therein at an end thereof on said optical axis, the end of the positioning assistance means being abutted against the object when said objective lens is in said second range span, the positioning assistance means being movable along the optical axis in such a manner that the end is located closer to the image pickup means when said objective lens is in said first range span than when it is in said second range span, said positioning assistance means is located at a position where the focal point of said objective lens falls on said opening when said objective lens is in said second range span; and that
the distance that said objective lens travels between said first range span and said second range span is smaller than the distance that said positioning assistance means travels in association with the movement of said objective lens between said first range span and said second range span.

17. The camera as claimed in claim 16, wherein said positioning assistance means is coaxial with said lens barrel.

18. A camera comprising a tubular lens barrel; an object lens contained in said lens barrel; and image pickup means for building up an image using the light from an object, the light from the object being adapted to be directed to the image pickup means though said objective lens, wherein:
said objective lens is movable along the optical axis of said light from the object at least between a first range span within which an image built up by the image pickup means is a demagnified image and a second range span within which an image built up by the image pickup means is a magnified image;
the camera further comprises positioning assistance means having an opening formed therein at an end thereof on said optical axis, the end of the positioning assistance means being abutted against the object when said objective lens is in said second range span, the positioning assistance means being movable along the optical axis in such a manner that the end is located closer to the image pickup means when said objective lens is in said first range span than when it is in said second range span, said positioning assistance means is located at a position where the focal point of said objective lens falls on said opening when said objective lens is in said second range span; and that
the distance that said objective lens travels between said first range span and said second range span is smaller than the distance that said positioning assistance means travels in association with the movement of said objective lens between said first range span and said second range span.

19. A unit for a camera that is freely attached and removed to and from a camera comprising image pickup means to which the light from the object is directed and a housing to which said image pickup means is fitted, the image pickup means being for building up an image using the light from the object, wherein:
the unit is integrally formed of:
a tubular lens barrel;
an objective lens through which said light from the object is directed to said image pickup means, the objective lens being contained in said lens barrel and movable along the optical axis of said light from the object at least between a first range span within which an image built up by the image pickup means is a demagnified image and a second range span within which an image built up by the image pickup means is a magnified image; and
positioning assistance means having an opening formed therein at an end thereof on said optical axis, the end of the positioning assistance means being abutted against the object only when said objective lens is in said second range span, the positioning assistance means being movable along the optical axis in such a manner that the end is located closer to the image pickup means when said objective lens is in said first range span than when it is in said second range span; and that
said positioning assistance means is located at a position where the focal point of said objective lens falls on said opening when said objective lens is in said second range span, said opening having a size that is generally equal to that of the region within which objects can be built up by said image pickup means when said objective lens is in said second range span; and
a manually-controlled means that is movable from a first position to a second position to correspondingly move said objective lens from said first range span to said second range span, in which the amount of movement of said objective lens in response to the movement of said manually-controlled means is smaller when said objective lens is inside said first range span and said second range span than when it is outside said first range span and said second range span.

20. A unit for a camera that is freely attached and removed to and from a camera comprising image pickup means to which the light from the object is directed and a housing to which said image pickup means is fitted, the image pickup means being for building up an image using the light from the object, wherein:
the unit is integrally formed of:
a tubular lens barrel;
an objective lens through which said light from the object is directed to said image pickup means, the objective lens being contained in said lens barrel and movable along the optical axis of said light from the object at least between a first range span within which an image built up by the image pickup means is a demagnified image and a second range span within which an image built up by the image pickup means is a magnified image; and
positioning assistance means having an opening formed therein at an end thereof on said optical axis, the end of the positioning assistance means being abutted against the object when said objective lens is in said second range span, the positioning assistance means being movable along the optical axis in such a manner that the end is located closer to the image pickup means when said objective lens is in said first range span than when it is in said second range span, said positioning assistance means is located at a position where the focal point of said objective lens falls on said opening when said objective lens is in said second range span; and that the distance that said objective lens travels between said first range span and said second range span is smaller than the distance that said positioning assistance means travels in association with the movement of said objective lens between said first range span and said second range span.

* * * * *